Dec. 14, 1954     P. DE FILLIPS     2,696,968
QUICK-ACTING FLUID CONTROL VALVE
Filed July 2, 1949     3 Sheets-Sheet 2
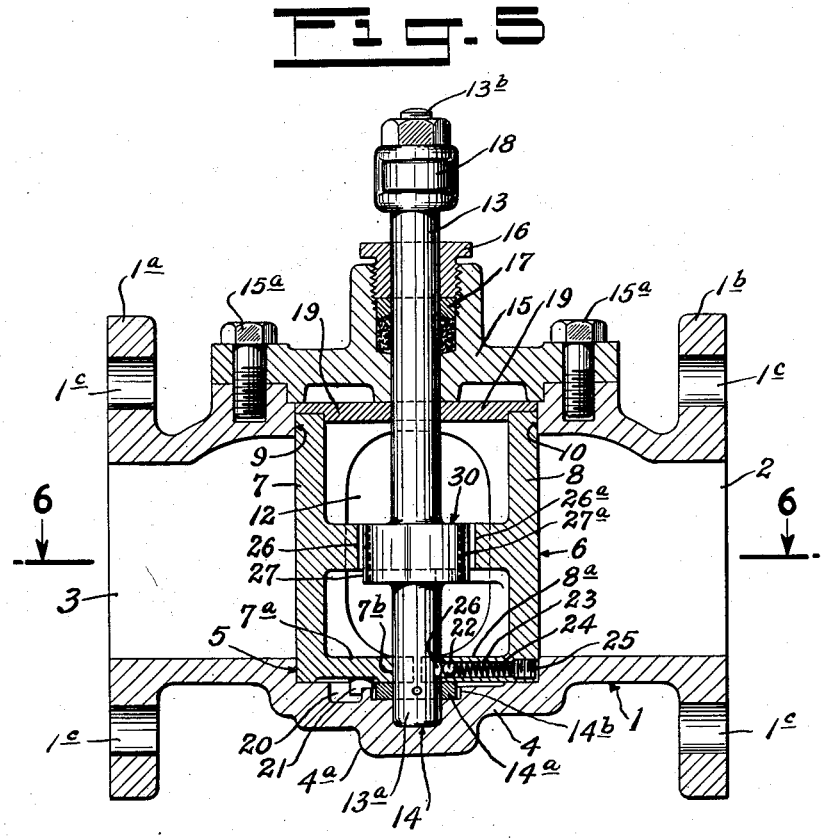
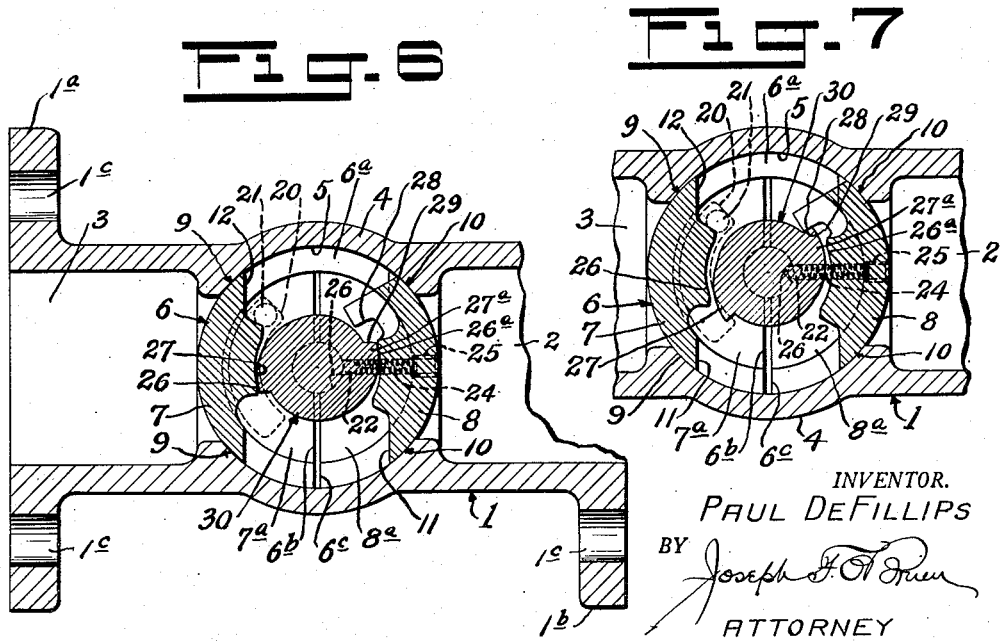
INVENTOR.
PAUL DEFILLIPS
BY
ATTORNEY Dec. 14, 1954  P. DE FILLIPS  2,696,968
QUICK-ACTING FLUID CONTROL VALVE
Filed July 2, 1949  3 Sheets-Sheet 3
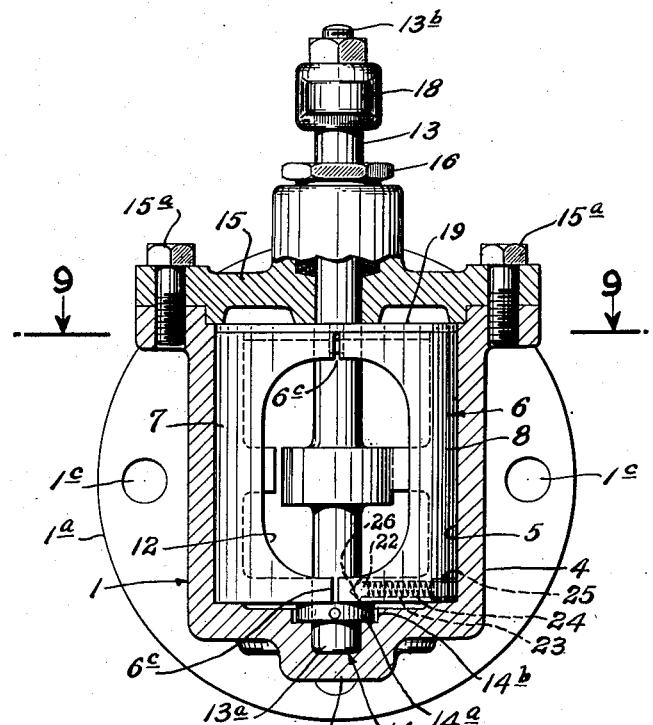
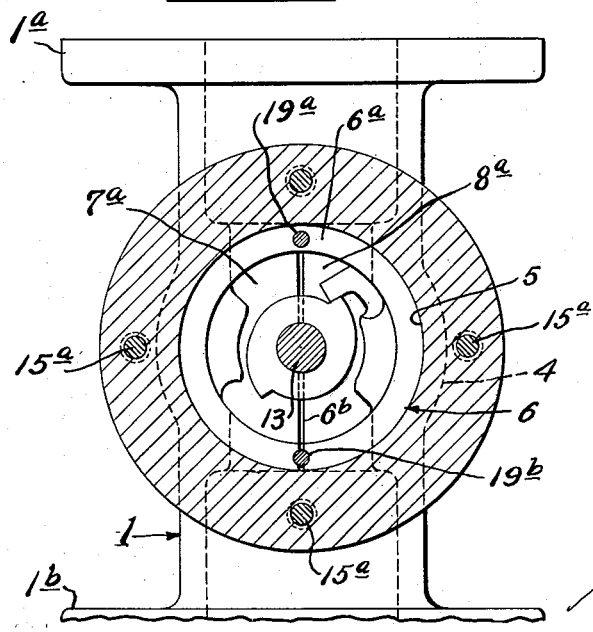
INVENTOR.
PAUL DE FILLIPS
BY
ATTORNEY

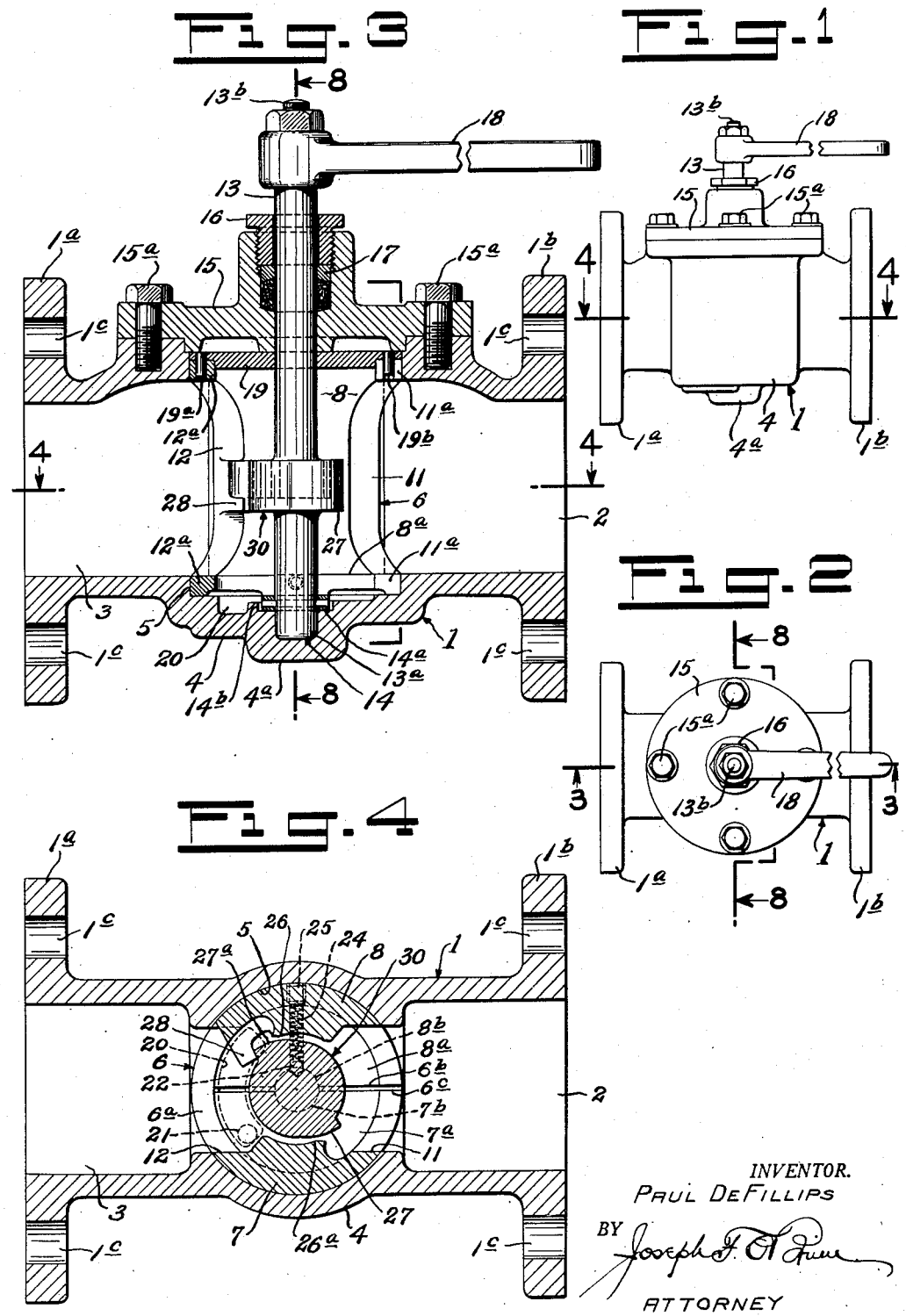

United States Patent Office 2,696,968
Patented Dec. 14, 1954

2,696,968

QUICK-ACTING FLUID CONTROL VALVE

Paul De Fillips, Fairview, N. J., assignor to Phillips Rotary Joint & Valve Corporation, West New York, N. J., a corporation of New Jersey Application July 2, 1949, Serial No. 102,727

4 Claims. (Cl. 251—192)

This invention relates to improvements in quick-acting fluid-control valves.

One of the objects of this invention is to provide a valve having a valve-piston unit that requires movement through an arc of only approximately 90° to turn from a fully-open position to a fully-seated position and thus enables speedy or quick operation by hand or by remote control either manually, electrically or hydraulically, and enables such remote control by simple and inexpensive operating gear.

Another object of my invention is to provide a valve having a valve-piston unit that is movable into extreme positions within the valve body without creating or producing friction between the wall of said valve body and the wall of the valve-piston unit.

Still another object of my invention is to produce a valve in which a valve-piston unit is provided with an operating element having a continuous operating movement comprising an initial seat-aligning movement of approximately 90° from a fully-open position to a position in alignment or registration with its seat and a secondary successive sealing movement which presses the valve piston radially by a cam action into a fully closed seat-sealing position.

Still another object of my invention is to provide in a valve of the type specified, a valve piston which is movable in a cylindrical valve chamber and has an initial arcuate movement from fully-open to fully-closed position, and is provided with an operating element having an initial operating movement for moving the piston through said arcuate movement and then in a secondary, successive sealing movement continuous with said arcuate movement from such open to closed position produces a radial expansion of said valve-piston member into tightened or sealed position, said successive movements thus reducing the possibility of scoring the seating surfaces of the valve body.

Still another object of my invention is to provide a valve having a valve piston member movable in an arcuate path and engageable by a valve stem mounted to rotate axially and in a continuous movement to cause an initial arcuate movement of said piston member from a fully-open into seat-aligned position, and then secondarily and finally by a further arcuate movement to actuate cam members which will produce a direct substantially-radial thrust of the valve piston to cause a sealing of the valve surfaces against the seating surfaces of the valve body walls and thus providing a greater mechanical advantage in applying the closing force than is usually obtained, thus resulting in an increased and powerful sealing force.

Still another object of my invention is to provide a valve body of the type specified with double seats, a valve element with a dual-piston member and an operating stem arranged to cause an initial, arcuate movement of the dual piston members and having double cam elements adapted to cause simultaneous radial sealing movements of the pistons and thus to produce an increased factor of safety against leakage.

Another object of my invention is to provide a dual piston member of the type specified in which the two pistons are combined or integrated to form a substantially cylindrical element adapted to fit within a cylindrical bore of the valve body and to be turned without friction therein and also adapted to produce a secondary sealing of the piston members on their seats by a radial expansion movement of the two piston members in relation to each other.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:

Fig. 1 is a view in side elevation of a valve embodying my invention;

Fig. 2 is a top plan view of the valve shown in Fig. 1;

Fig. 3 is a vertical section on the line 3—3 of Fig. 2 looking in the direction of the arrows and showing the valve piston members in open position;

Fig. 4 is a horizontal section either on the line 4—4 of Fig. 1 or on the line 4—4 of Fig. 3, looking in the direction of the arrows;

Fig. 5 is a section similar to Fig. 3 showing the valve piston member in seat-aligned and sealed condition;

Fig. 6 is a horizontal section on the line 6—6 of Fig. 5 looking in the direction of the arrows and showing my double piston members and operating stem in seat-aligned and sealed condition;

Fig. 7 is a fragmentary view in horizontal section similar to Fig. 6 showing an intermediate position of the piston and its operating stem with the said double piston members in seat aligned position but not sealed on the valve seats;

Fig. 8 is a vertical section on either the line 8—8 of Fig. 2 or on the line 8—8 of Fig. 3; and Fig. 9 is a horizontal section on the line 9—9 of Fig. 8 looking in the direction of the arrows.

Referring now to these drawings, which illustrate a preferred embodiment of my invention, 1 indicates a valve casing including conventional attaching flanges 1ᵃ—1ᵇ having the usual bolt holes 1ᶜ. The casing 1 has inlet and outlet channels 2 and 3 and is provided with a valve body 4 provided with a cylindrical bore 5 within which is mounted a valve-piston unit 6 comprising, in the double embodiment shown, two horizontally-arcuate piston members 7 and 8. Each of the arcuate piston members 7 and 8 is of sufficient height and area to close against one of the seats 9 and 10 and thus to control or shut off passage of a fluid through the channels 2 or 3. It is desirable to provide an increased factor of safety against leakage and a balanced arrangement of the piston members, and I therefore preferably employ a hollow cylindrical plug-shaped valve-piston unit 6 initially open at its upper end and which loosely fits the cylindrical bore 5 of the valve body 4. A pair of such piston members 7 and 8 are formed in said unit 6, arranged oppositely to each other and connected together by an integral cylindrical wall portion 6ᵃ as shown in Figs. 4, 6, 7 and 9. When, as in the embodiment illustrated, two of such arcuate piston elements are employed, the hollow plug is thus split into sections on opposite sides of the integral cylindrical wall portion 6ᵃ which contains a fluid-passing opening which caused this wall section to be resilient to permit radial movement of the parts as hereinafter specified. Each hollow semi-cylindrical section thus forms one of the said piston members 7 and 8 and they are adapted simultaneously to close against both seats 9 and 10 and thus by double means to control the passage of fluid through the oppositely positioned seats 9 and 10, which in turn doubly control the flow of fluid through the channels 2 and 3.

In said dual-piston embodiment shown, I provide means for operating the dual arcuate piston members 7 and 8 from the full-open position shown in Figs. 3 and 4 to a seat-aligned position shown in Fig. 7, and, in the same continuous operation, moving the parts into the completely closed and sealed positions shown in Figs. 5 and 6.

In the preferred embodiment of my invention the piston unit 6 is slitted at its bottom portion 6ᵇ and at its cylindrical edge 6ᶜ to provide the double piston members 7 and 8, each of which is provided with semi-circular bottom portions 7ᵃ, 8ᵃ having sectional arcuate bearing openings 7ᵇ, 8ᵇ for the passage of an operating member. Said piston members 7 and 8 are conjointly provided with fluid-passing openings 11 and 12 which are oppositely positioned and formed in the sections of split, cylindrical wall 11ᵃ and in the integral cylindrical wall section 12ª so that in open position of the said dual piston unit 6, these openings 11 and 12 register with seats in the walls of the fluid flow channels 2 and 3, respectively, and in such open position permit a free flow of fluid or liquid through said dual piston member 6 from one of such channels to the other or vice versa.

In accordance with my invention, each of the piston members 7 and 8 has dual movements comprising an arcuate movement from open position to a relatively-loose seat-aligned position and vice versa, and a radial thrust movement from seat-aligned to a tight seat-sealed position and vice versa. In the preferred embodiment shown, members 7 and 8 are moved together through such dual movements. Thus, the piston unit 6, as illustrated, is mounted to rotate in the said cylindrical bore 5 and each of the members 7 and 8 moves in an arcuate path therein from open to closed position and vice versa, and having an integral wall section, they are first conjointly movable through an arc of a circle or in an arcuate path from a full open position, as shown in Figs. 3 and 4 in which the piston openings formed by edges 11ª and 12ª of the members 7 and 8 register with walls of the channels to permit a free flow of fluid or liquid through said valve piston members into the seat-aligned position shown in Fig. 7, and thereafter, by a radial thrust of the operating member against each of the piston members they are forcibly moved radially to place the same into sealed contact with the seats illustrated in Figs. 5 and 6.

In the preferred embodiment of my invention illustrated the operating member comprises a valve stem or operating shaft 13 which is mounted axially within the cylindrical bore 5 and, as shown, has its end 13ª seated in a depressed bearing bore 14 in the bottom 4ª of the valve body 4 and has fixedly mounted thereon a bearing washer 14ª which is seated in a secondary bore 14ᵇ and suitably fastened to the lower end of the stem 13, which extends through the sectional bearing openings 7ᵇ, 8ᵇ of the semi-circular bottom portions 7ª and 8ª of the piston members 7 and 8. The opposite end 13ᵇ of the stem 13 extends upwardly through a bore closure member 15 which, as shown, is suitably fastened by bolts 15ª and is provided with a screw-threaded bearing element 16 and a suitable stuffing box 17. Said upper end 13ᵇ is, as shown, provided with an actuating handle 18 adapted to move the stem or operating stem or shaft member 13 in the arc of a circle, while intermediate its ends said stem is provided with means for moving and controlling the movements of said piston members 7 and 8.

The two piston members 7 and 8 are, as aforesaid, movable radially and, in the preferred embodiment shown, the connection together by integral portions of the slitted cylindrical wall permits expansion radially in relation to each other for the purpose of sealing the piston members against the seat openings after the same has initially been placed in registration or alignment therewith as shown in Fig. 7. The piston unit 6, which as above indicated comprises a cylindrical hollow plug, is provided with a top-closure plate 19 which is loosely fastened by connections 19ª, 19ᵇ to the split cylindrical wall to permit outward or radial movement of the parts.

In accordance with my invention, the conjoint arcuate movement of the members of the piston unit is limited to permit movement to extreme—or fully-open and seat-aligned—positions and to avoid any additional movement thereof, and for this purpose I preferably provide in the bottom surface of the bore 5 an arcuate groove 20 and mount on the bottom surface of one of the conjointly-movable members comprising the piston unit a projection 21 fitting into said groove. The arcuate groove 20 follows an arc which is substantially 90° of a circle to permit and limit the movement of the piston unit from said fully-open position to seat-aligned position and vice versa, and as the two members 7 and 8 of the piston unit move together, a single projection and groove will limit the arcuate movement of both conjointly-movable piston members in their arcuate movements.

My preferred means for coupling the piston-unit with the operating member or stem 13 to produce arcuate movement of said unit comprises a spring-pressed ball-catch 22 which, as shown, is mounted within and has a portion projecting outwardly from a bore 23 to make a coupling connection with a semi-spherical depression 26 in the operating stem 13. As shown, the bore 23 is formed in one of the lower semi-circular segments of the conjointly-movable piston unit 6 and the ball 22 projects through the bearing surface 8ᵇ of the segment 8ª which bears on the stem 13. Said ball 22 is pressed toward said axis of the stem 13 by a spiral spring 24 mounted in the bore 23, the outer end of which is threaded and closed by a threaded plug 25, and obviously the said ball 22 will releasably couple and connect the piston members with the stem during operating movements of the latter, and a movement of the pistons is thus produced which will be limited by the groove 20 and projection 21 hereinabove recited. Obviously also, when the movement of the piston unit is stopped the ball coupling will be released to enable a relative arcuate movement of the stem and piston unit and this relative arcuate movement is utilized to move the piston units radially into tightly closed positions against their seats, and in order to procure a tight and sealed connection, I preferably apply by such additional movement a cam-action that produces an increased mechanical force over other piston sealing devices.

With this end in view, each of the piston members 7 and 8 is preferably provided with cam surfaces 26—26ª and the stem 13 is provided with cam members 27—27ª adapted on such additional rotary movement to engage the cam engaging surfaces on the pressure-shoe bosses 26, 26ª and through such engagement to provide a radial thrust on the piston members that will force the same into tightly-sealed engagement with the seats 9 and 10, when said members have, as aforesaid, been initially turned into alignment or registration to cause such engagement.

In the preferred embodiment of my invention, the additional movement of the stem 13 in relation to the pistons is limited by the provision on one of the piston members of an aligning or safety projection 28 which is adapted to engage a projection 29 on cam 27ª of the double acting cam member 30 and to prevent excessive relative movement between the stem and piston unit, particularly during the returning or opening movement of the parts.

The operation of the valve is as follows:

Starting from the full open position, we will describe a complete cycle of the movement from a fully-open to fully-shut and sealed condition and then to fully-open position.

Assuming the valve piston to be in full open position shown in Figs. 3 and 4, the spring loaded ball catch 22 is engaged between the piston and the stem 13 and interlocks the same. The cam stem 13 is now rotated clockwise 90° by turning the handle 18 and stem 13. This movement of the stem 13 carries the piston unit 6 with it into the position shown in Fig. 7 because the spring-loaded ball catch 22 is in engagement with the cam stem 13 and with the piston-unit 6. At the end of the 90° rotation, the stop boss projection 21 at the base portion of the pistons reaches its limit of travel in the groove 20 in the bottom of the valve body, thus restricting the piston unit 6 from any further rotary motion. During this 90° rotary motion of the valve stem the conjointly-movable piston members 7 and 8 of the piston unit 6 turn freely in the valve body 4 and the cam mechanism has not yet come into play.

I now continue to turn the handle 18 in the same direction, and as the piston unit 6 cannot rotate any further due, as aforesaid, to the stop boss 21 having been advanced to its limit of travel, the spring loaded ball catch 22 will be forced out of its engagement in the depression or recess 26 in the stem 13 and back into the bore 23 in the lower segmental body portion of the piston unit 6. This backing away or recession of the ball catch 22 occurs simultaneously with an overriding or additional advancement of the stem 18.

When the ball-catch 22 is fully retired into the bore on the piston unit 6 so that it can no longer influence the stem or the piston in relation to one another, the cam members 27—27ª will come into play and perform their intended functions. Thus, when the stem 13 is continued to be turned, the cam sections or members 27, 27ª of the stem 13 now contact the cam surfaces 26ᵇ—26ᶜ on the pressure-shoe bosses 26, 26ª on the inside surface of the piston unit members 7 and 8. This further rotary motion of the stem 13 thus results in a direct thrust of the sealing surfaces of the piston unit against the sealing surfaces or seats of the valve body by virtue of the wedging action taking place in the contact between the cams and the cam surfaces on the pressure shoes of the piston unit 6. At this point, the valve piston 6 is no longer being rotated because the stop boss has restricted further rotary motion of the piston and the additional rotary motion of the cam stem is converted to a direct thrust of the piston wall-surfaces against the surfaces of the valve body due to the wedging action created by the cams. In the embodiment shown, the direct thrust of the walls of the piston unit against the walls of the valve body is obtainable because the two piston members 7 and 8 comprising the piston unit 6 are expansible relatively to each other, and such expansion is permitted by virtue of the partial split of the piston unit 6 in a line at 90° to the center line of the valve.

To open the valve and return the piston members to fully open position, the valve handle is turned in a counter-clockwise direction. The first rotary movement of the stem relieves the pressure between the surfaces of the cam and the cam surfaces on the pressure shoes. The ball-catch 22 will be forced by the spring 24 into coupling connection of the stem and the piston unit when the depression or recess in the cam stem coincides with the bore 23 in the piston unit 6. Until this occurs, the stem 13 only is rotating and the piston has not rotated but being relieved of cam pressure contracts away from the walls of the valve body. The piston unit 6 upon coupling rotates with the cam stem until a full open position is obtained. The ball catch 22 couples and connects because the safety stop 28 is so positioned to prevent override of the stem and aligns the recess therein in relation to the piston in the counter-clockwise or closing direction rotation of the valve handle.

Having described my invention, I claim:

1. A quick-acting fluid-control valve embodying a casing having an inlet and outlet for the fluid to be controlled, said casing having a valve seat, a piston unit mounted to rotate in a single plane in said casing, means for limiting the rotary movement of said unit to move from an open position to a closed position in alignment with said valve seat and vice versa, and operating means for initially moving said piston unit through said limit of rotary movement and independent means operable on release of said spring-actuated automatically engageable and releasable member for thereafter applying to said piston unit a radial movement to force the same tightly against said valve seat, and operating means comprising a stem mounted axially to rotate in said casing in a horizontal plane of rotation from said open to closed positions and vice versa, said spring-actuated automatically-engaging and disengaging members comprising an automatically-releasable coupling means for initially coupling said stem and piston unit during movement of said unit through said limit of rotary movement from a fully-open position to a position in alignment with said seat, and then automatically uncoupling said stem and unit to release the latter, said stem after said release having a secondary rotary movement continuous with and in the same direction and plane as said initial rotary movement, and a cam member connected with said stem and operable during said secondary rotary movement thereof to produce a radial pressure against said piston unit to force the same tightly into sealed relationship with said seat.

2. A quick-acting fluid-control valve embodying a casing having an inlet and outlet for the fluid to be controlled, said casing having a valve seat, a piston unit mounted to rotate in a single plane in said casing, means for limting the rotary movement of said unit to move from and open position to a closed position in alignment with said valve seat and vice versa, and operating means for initially moving said piston unit through said limit of rotary movement and thereafter applying to said piston unit a radial movement to force the same tightly against said valve seat, said operating means comprising a stem mounted axially to rotate in said casing in a horizontal plane of rotation from said open to closed positions and vice versa and, spring-actuated automatically-releasable coupling means for initially coupling said stem and piston unit during movement of said unit through said limit of rotary movement from a fully-open position to a position in alignment with said seat, and then automatically uncoupling said stem and unit to release the latter, said stem after said release having a secondary rotary movement continuous with and in the same direction and plane as said initial rotary movement and a cam member formed integrally with said stem and operable during said secondary rotary movement thereof to produce a radial pressure against said piston unit to force the same tightly into sealed relationship with said seat, said cam member being arranged by cam friction to limit said continuous secondary movement between said stem and piston unit.

3. A quick acting fluid-control valve as claimed in claim 2 in which upon a reverse movement of the stem, the coupling means is automatically recoupled and cooperating interengaging projections on said stem and piston unit are provided to move the piston unit to open position.

4. A quick-acting fluid-control valve embodying a casing having an inlet and outlet for the fluid to be controlled, said casing having a valve seat, a piston unit mounted to rotate in a single plane in said casing, means for limiting the rotary movement of said unit to move from an open position to a closed position in alignment with said valve seat and vice versa, operating means for initially moving said piston unit through said limit of rotary movement and thereafter applying to said piston unit a radial movement to force the same tightly against said valve seat, said operating means comprising a stem mounted axially to rotate in said casing in a horizontal plane of rotation from said open to closed positions and vice versa and, spring-actuated automatically-releasable coupling means for initially coupling said stem and piston unit during movement of said unit through said limit of rotary movement from a fully-open position to a position in alignment with said seat and then uncoupling said stem and unit to release the latter, said stem after said release having a secondary rotary movement continuous with and in the same direction and plane as said initial rotary movement, and means connected with said stem and operable during said secondary rotary movement thereof to produce a radial pressure against said piston unit to force the same tightly into sealed relationship with said seat, said last-mentioned means comprising a cam member integral with said operating stem and movable during said secondary movement to wedge against a cam surface on the piston unit and to forcibly press the piston unit members radially against their seats to produce a sealing action therewith.

References Cited in the file of this patent

UNITED STATES PATENTS

| Number | Name | Date |
| --- | --- | --- |
| 1,572,985 | Bottner | Feb. 16, 1926 |
| 1,888,000 | Heggem | Nov. 15, 1932 |
| 1,904,467 | Karnath | Apr. 18, 1933 |
| 1,951,878 | Lundgren | Mar. 20, 1934 |
| 2,038,132 | Robinson | Apr. 21, 1936 |
| 2,097,285 | Lundgren | Oct. 26, 1937 |
| 2,246,764 | Seamark | June 24, 1941 |
| 2,261,535 | Wheatley | Nov. 4, 1941 |

FOREIGN PATENTS

| Number | Country | Date |
| --- | --- | --- |
| 540,231 | Germany | Dec. 9, 1931 |